3,463,751
DRY POWDERY NONBLOCKING VINYL ESTER-ETHYLENE COPOLYMER COMPOSITIONS AND PROCESS FOR THE PRODUCTION THEREOF

Noboru Hasegawa, Nobuo Ishikawa, and Susumu Kondo, Ogaki-shi, Japan, assignors to Nippon Gosei Kagaku Kogyo Kabushiki Kaisha, Osaka, Japan, a corporation of Japan
No Drawing. Filed June 15, 1966, Ser. No. 579,441
Claims priority, application Japan, June 16, 1965, 35,817/65
Int. Cl. C08f 47/02
U.S. Cl. 260—23  2 Claims

ABSTRACT OF THE DISCLOSURE

A dry powdery nonblocking vinyl ester-ethylene copolymer composition which will not become sticky during storage or shipping or under a high atmospheric temperature in the summer and which can be dry-blended with vinyl chloride resin. An antisticking agent is mixed with a polyvinyl chloride powder with a finely divided and nondried copolymer of ethylene and vinyl ester of an aliphatic carboxylic acid having 1 to 4 carbon atoms. Examples of said vinyl ester are vinyl formate, vinyl acetate, vinyl propionate and vinyl lactate. The copolymer is not only a copolymer of such vinyl ester and ethylene but may also contain a small amount of the other copolymerizable monomer selected from the group consisting of vinyl chloride and acrylic acid, methacrylic acid, crotonic acid, maleic acid, and $C_1$ to $C_8$ alkyl esters and anhydrides thereof.

---

The present invention relates to a novel dry powdery nonblocking vinyl ester-ethylene copolymer composition and a process for producing the same.

A copolymer of ethylene and such vinyl ester of a lower aliphatic carboxylic acid as vinyl acetate is useful for various uses, particularly as a blending material for improving the properties, such as thermoplasticity and shock-resistance, etc., of vinyl chloride resin moldings. In blending the copolymer and vinyl chloride resin, however, there may be some difficulties because the copolymer is usually supplied in the form of soft block or agglomerated particles, especially in case vinyl ester content in the copolymer is greater. For such blending, it needs to use high-priced mixers as employed in rubber industry. If the copolymer should be obtained as finely divided form, the blending operation should be more easily carried out by only employing a simple mixer. It is very difficult to obtain the copolymer as the form of nonagglomerative dried powder or fine particles because it is thermoplastic and has soft and sticky surface even at a room temperature, while it may be powdery in wet state with a nonsolvent liquid such as water, methanol, ethanol, n-hexane or the like.

An object of the present invention is to provide a novel dry powdery nonblocking vinyl ester-ethylene copolymer composition.

Another object of the present invention is to provide a stable dry powdery vinyl ester-ethylene copolymer composition which will not become sticky during storage or shipping or under a high atmospheric temperature condition in summer.

A further object of the present invention is to provide a dry powdery vinyl ester-ethylene copolymer composition which can be dry-blended with vinyl chloride resin.

A still further object of the present invention is to provide a process for producing such dry powdery vinyl ester-ethylene copolymer composition.

Other objects of the present invention will become clear from the following specification and claims.

It has now been discovered that the above mentioned objects can be easily attained by mixing such antisticking agent as described in detail later and a polyvinyl chloride powder with a finely divided and nondried copolymer of ethylene and vinyl ester of an aliphatic carboxylic acid having 1 to 4 carbon atoms. Examples of said vinyl ester are vinyl formate, vinyl acetate, vinyl propionate and vinyl butyrate. The copolymer to be used in the present invention is not only a copolymer of such vinyl ester and ethylene but may also contain a small amount of the other copolymerizable monomer selected from the group consisting of vinyl chloride, and acrylic acid, methacrylic acid, crotonic acid, maleic acid, and $C_1$ to $C_8$ alkyl esters and anhydrides thereof.

The ratio of the vinyl ester and ethylene by weight in such copolymer is about 30:70 to about 80:20, preferably about 40:60 to about 70:30; and the ratio of the other copolymerizable monomer, if it is used, to such copolymer is up to about 20% by weight.

The antisticking agents to be used in the present invention are enumerated in the following:

(A) An inorganic lead salt selected from the group consisting of sulfate, phosphite, silicate and carbonate of lead. Examples are tribasic lead sulfate, dibasic lead phosphite, basic lead silicate, lead silicate modified with silicogel basic lead carbonate and the like.

(B) A salt of a metal and a carboxylic acid; said metal being a member selected from the group consisting of lead, cadmium, barium, calcium, zinc and tin, and said carboxylic acid being a member selected from the group consisting of higher aliphatic carboxylic acids having 10 to 20 carbon atoms, phthalic acid, salicylic acid and naphthenic acid. Examples are lead stearate, basic lead stearate, dibasic lead stearate, cadmium stearate, calcium stearate, zinc stearate, tin stearate, lead ricinoleate, cadmium ricinoleate, barium ricinoleate, calcium ricinoleate, zinc ricinoleate, tin ricinoleate, cadmium laurate, barium laurate, calcium laurate, zinc laurate, barium oleate, cadmium oleate, calcium oleate, tin oleate, dibasic lead phthalate, lead salicylate, lead naphthenate and the like.

(C) A dialkyl tin carboxylic acid salt selected from the group consisting of dialkyl tin di-higher aliphatic carboxylate, dialkyl tin maleate and dialkyl tin higher aliphatic carboxylate-maleate (wherein the alkyl group has 3 to 10 carbon atoms and the higher aliphatic carboxylic acid has 10 to 20 carbon atoms). Examples are dibutyl tin dilaurate, dioctyl tin dilaurate, dibutyl tin distearate, dioctyl tin distearate, dibutyl tin maleate, dioctyl tin maleate, dibutyl tin laurate-maleate, dioctyl tin laurate-maleate, dibutyl tin stearate-maleate, dioctyl tin stearate-maleate, dibutyl tin oleate-maleate, dioctyl tin oleate-maleate and the like.

(D) An agent selected from the group consisting of calcium carbonate, clay, kaolin, talc and silica.

(E) A higher aliphatic alcohol having 10 to 20 carbon atoms. Examples are cetyl alcohol, stearyl alcohol and the like.

(F) A compound selected from the group consisting of higher aliphatic acid, and alkyl ester, polyoxyethylene ester and amide thereof (wherein the higher aliphatic acid has 10 to 20 carbon atoms and the alkyl group has 3 to 18 carbon atoms) and methylene stearobisamide. Examples are stearic acid, palmitic acid, oleic acid, butyl stearate, butyl palmitate, butyl oleate, octyl stearate, octyl palmitate, octyl oleate, cetyl stearate, cetyl palmitate, cetyl oleate, polyoxyethylene stearate, polyoxyethylene palmitate, polyoxyethylene oleate, stearic acid amide, palmitic acid amide, oleic acid amide, methylene stearobisamide and the like.

Not only one, but also two or more of these antisticking agents for such vinyl ester-ethylene copolymers, may be used properly as required.

As these antisticking agents are generally used as an additive for molding a vinyl chloride resin itself, there will be no trouble in case of blending the dry powdery copolymer composition obtained by the present invention with a vinyl chloride resin.

In the present invention, it is essential to use the polyvinyl chloride powder together with the antisticking agent. If the use of either of them is omitted, there is scarcely effective for the purpose of the present invention. By using both of them, such difficulties as mentioned above can be perfectly eliminated. It is preferable that the polyvinyl chloride powder is fine powder less than about 40$\mu$.

In producing the copolymer composition of the present invention, the above mentioned antisticking agent and polyvinyl chloride powder are mixed with finely divided and wet vinyl ester-ethylene copolymer and the mixture is dried. The wet powder of said copolymer may be aqueous suspension, emulsion, slurry or wet cake of the copolymer obtained by suspension or emulsion polymerization process; or by precipitating the copolymer from an organic solution thereof. Especially, the application of the present invention to the copolymer obtained by the suspension polymerization process may simplify the steps and is economically advantageous. In each of such case, the amount of the antisticking agent and polyvinyl chloride powder to be used should be determined to be of proper values depending on their kinds and the composition or intrinsic viscosity of the copolymer to be treated. However, for said copolymer, it is proper to select the range of about 2 to 30 parts by weight of the former and the range of about 2 to 50 parts by weight of the latter per 100 parts by net weight of the copolymer. Either of them may be added first or both may be added simultaneously.

Thus obtained copolymer composition can be dried by any method without agglomeration and does not form any block itself during storage or shipping, even in summer season.

In case the thus obtained copolymer composition is used to improve the shock-resistance and other properties of vinyl chloride resin molding as described above, it can be very simply and easily dry-blended with the vinyl chloride resin. Further, this copolymer composition itself is useful as a powdery binder for paper, cloth, plastic sheets and the like.

The present invention is illustrated and is not limited by the following examples in which all percentages are by weight unless otherwise stated.

EXAMPLE 1

A 1 liter autoclave provided with a magnetic stirrer was charged with 80 g. of vinyl acetate, 400 g. of water (purified by ion-exchange resin, and so forth), 0.8 g. of azobisisobutyronitrile (polymerization catalyst), 0.8 g. of polyvinyl alcohol (dispersing agent) and 0.4 g. of sodium polyacrylate dispersing agent). And then air in the autoclave was replaced with nitrogen and then with ethylene and thereafter the inner temperature of the autoclave was raised to 65° C. and ethylene was introduced into the autoclave under the pressure of 75 kg./cm.$^2$ to carry out a suspension polymerization for 9 hours.

An aqueous suspension containing 80 g. of vinyl acetate-ethylene copolymer was thus obtained. On the analysis of said copolymer, the weight ratio of vinyl acetate and ethylene was 7:3 and the intrinsic viscosity ($\eta$) determined by using benzene as a solvent at the temperature of 30° C. was 0.1. The copolymer was washed with water, filtered and then dispersed into methanol. 3 g. of powdery barium stearate (3.7% based on copolymer) and 20 g. of polyvinyl chloride having a particle size of about 2$\mu$ were added to the methanol slurry of the copolymer and then sufficiently agitated and mixed together. And then methanol was removed from the slurry and the residue was dried at room temperature. The copolymer composition thus obtained was white fine powder and no agglomeration of the powder took place.

On the contrary, Example 1 was repeated except that the addition of barium stearate was omitted as a control. The obtained composition was sticky and a number of small agglomerations were found. In the case of no use of barium stearate and polyvinyl chloride powder, the product agglomerates to form some large blocks after drying.

EXAMPLES 2 TO 33

Example 1 was repeated except that each anti-sticking agent as described in the following Table 1 was used in place of barium stearate and the drying was carried out at the temperature of 70° C. for 5 hours to obtain dry powdery vinyl acetate-ethylene copolymer composition.

The obtained copolymer composition was dry white nonagglomerating powder as in Example 1 in any case. These compositions were respectively put into a bag and a load test was carried out at the temperature of 40° C. for 30 hours. As the result any blocking or agglomeration was not found under a load of about 150 to 200 kg./cm.$^2$, respectively.

On the contrary, as a control, when the use of polyvinyl chloride powder was omitted a blocking was found in any case after the composition was dried at the temperature of 70° C.

TABLE 1

| Example No. | Antisticking agent Kind | Added amount (percent based on copolymer) |
|---|---|---|
| 2 | Tribasic lead sulfate | 12 |
| 3 | do | 19 |
| 4 | Dibasic lead phosphite | 12 |
| 5 | Basic lead silicate | 20 |
| 6 | Lead hydroxy carbonate | 20 |
| 7 | Dibasic lead phthalate | 10 |
| 8 | Dibasic lead stearate | 5 |
| 9 | Lead silicate modified with silica gel | 5 |
| 10 | Lead salicylate | 25 |
| 11 | Lead naphthenate | 18 |
| 12 | Lead stearate | 4 |
| 13 | Cadmium ricinoleate | 15 |
| 14 | Barium laurate | 6 |
| 15 | Cadmium oleate | 12 |
| 16 | Zinc stearate | 6 |
| 17 | Dibutyl tin distearate | 4 |
| 18 | Dibutyl tin maleate | 9 |
| 19 | Dioctyl tin oleate-maleate | 6 |
| 20 | Calcium carbonate | 20 |
| 21 | Clay | 25 |
| 22 | Kaolin | 25 |
| 23 | Talc | 25 |
| 24 | Stearic acid | 12 |
| 25 | Palmitic acid | 12 |
| 26 | Butyl stearate | 12 |
| 27 | Cetyl stearate | 10 |
| 28 | Polyoxyethylene stearate | 10 |
| 29 | Stearic amide | 22 |
| 30 | Palmitic amide | 22 |
| 31 | Methylene stearobisamide | 5 |
| 32 | Cetyl alcohol | 22 |
| 33 | Stearyl alcohol | 20 |

The copolymer composition obtained in Example 31 is a white fine powder, whereas as a control in Example 31, the copolymer composition obtained without the use of polyvinyl chloride powder resulted in agglomeartion.

EXAMPLE 34

A 1 liter autoclave was changed with 100 g. of vinyl acetate, 300 g. of water, 1 g. of azobisisobutyronitrile, 1 g. of polyvinyl alcohol and 0.5 g. of sodium polyacrylate and a suspension polymerization was carried out for 7 hours while ethylene was introduced into the autoclave under the pressure of 80 kg./cm.$^2$ at the temperature of 75° C. and thereafter 12 g. of vinyl chloride was further added and then a polymerization was continued for 5 hours.

An aqueous suspension containing 105 g. of vinyl acetate-ethylene-vinyl chloride copolymer was thus obtained. On the analysis of the copolymer, the weight ratio of vinyl acetate:ethylene:vinyl chloride was 58.7:35.1:6.2 and the intrinsic viscosity of the copolymer $[\eta]$ was 0.10. The copolymer was filtered and washed with water. To the resultant wet cake of the copolymer having 9% of water content, 5 g. of very fine barium stearate (5% based on copolymer) and 10.5 g. of polyvinyl chloride powder having a particle size of about $3\mu$ (10% based on copolymers) were added and then mixed together with agitation and thereafter was dried. As the result, a white fine powdery copolymer composition was obtained. The powder of the composition was not sticky.

As a control, furthermore, Example 34 was repeated except that the use of barium stearate was omitted. In this case, a copolymer composition was obtained in the form of agglomerates.

EXAMPLES 35 TO 43

Example 34 was repeated except that anti-sticking agents described in the following Table 2 in place of barium stearate was used to obtain powdery vinyl acetate-ethylene-vinyl chloride copolymer composition. In any case, the white fine powdery copolymer composition was not sticky as in Example 34.

TABLE 2

| Example No. | Antisticking agent Kind | Added amount (percent based on copolymer) |
|---|---|---|
| 35 | Cadmium stearate | 5 |
| 36 | Cadmium laurate | 5 |
| 37 | Methylene stearobisamide | 5 |
| 38 | Calcium stearate | 5 |
| 39 | Zinc stearate | 5 |
| 40 | Barium ricinoleate | 18 |
| 41 | Dibutyl tin laurate | 4 |
| 42 | Octyl stearate | 12 |
| 43 | Oleic amide | 2 |

EXAMPLE 44

A 1 liter autoclave was charged with 80 g. of vinyl acetate, 400 g. of water, 0.8 g. of azobisisobutyronitrile, 0.8 g. of polyvinyl alcohol and 0.4 g. of sodium polyacrylate and a suspension polymerization was carried out by introducing ethylene at a pressure of 110 kg.cm.$^2$ and a temperature of 65° C. for 12 hours.

An aqueous suspension containing 93 g. of vinyl acetate ethylene copolymer was thus obtained. The weight ratio of vinyl acetate:ethylene of said copolymer was 42:58 and the intrinsic viscosity $[\eta]$ was 0.06.

The copolymer was washed with water, filtered and then dispersed into ethanol. 2.8 g. of fine powdery barium stearate (3% based on copolymer) and 27.9 g. of polyvinyl chloride powder having a particle size of about $5\mu$ were added to the ethanol slurry of the copolymer and then thoroughly agitated and mixed together. Ethanol was then removed from the slurry and the residue was dried at room temperature. As the result, a white fine powdery copolymer composition was obtained. The powder of the composition was not sticky.

EXAMPLES 45 TO 82

Example 44 was repeated except that anti-sticking agents described in the following Table 3 were used in place of barium stearate and the amount of polyvinyl chloride powder employed was varied to obtain powdery vinyl acetate-ethylene copolymer composition. In any case, the obtained product was a white fine powdery copolymer composition which did not agglomerate as in Example 44.

TABLE 3

| Example No. | Antisticking agent Kind | Added amount (percent) | Added amount of polyvinyl chloride powder (percent) |
|---|---|---|---|
| 45 | Tribasic lead sulfate | 7 | 30 |
| 46 | Dibasic lead phosphite | 7 | 30 |
| 47 | Lead salicylate | 7 | 45 |
| 48 | Lead stearate | 7 | 15 |
| 49 | Dibasic lead stearate | 7 | 15 |
| 50 | Cadmium stearate | 4 | 30 |
| 51 | Calcium stearate | 10 | 4 |
| 52 | Zinc stearate | 10 | 6 |
| 53 | Tin stearate | 3 | 35 |
| 54 | Calcium ricinoleate | 10 | 30 |
| 55 | Barium ricinoleate | 10 | 30 |
| 56 | Zinc ricinoleate | 10 | 30 |
| 57 | Cadmium ricinoleate | 10 | 30 |
| 58 | Barium laurate | 3 | 35 |
| 59 | Zinc laurate | 3 | 35 |
| 60 | Cadmium laurate | 3 | 35 |
| 61 | Tin oleate | 5 | 30 |
| 62 | Dibutyl tin distearate | 3 | 25 |
| 63 | Dioctyl tin dilaurate | 5 | 25 |
| 64 | Dibutyl tin maleate | 12 | 30 |
| 65 | Dioctyl tin maleate | 10 | 30 |
| 66 | Dibutyl tin laurate-maleate | 5 | 15 |
| 67 | Dioctyl tin stearate-maleate | 5 | 15 |
| 68 | Talc | 10 | 30 |
| 69 | Colloidal silica | 10 | 30 |
| 70 | Calcium carbonate | 10 | 30 |
| 71 | Clay | 10 | 30 |
| 72 | Stearic acid | 4 | 40 |
| 73 | Palmitic acid | 4 | 40 |
| 74 | Oleic acid | 4 | 40 |
| 75 | Butyl palmitate | 5 | 35 |
| 76 | Cetyl oleate | 5 | 35 |
| 77 | Polyoxyethylene palmitate | 5 | 35 |
| 78 | Stearic amide | 10 | 30 |
| 79 | Oleic amide | 10 | 30 |
| 80 | Methylene stearobisamide | 10 | 7 |
| 81 | Cetyl alcohol | 10 | 30 |
| 82 | Stearyl alcohol | 10 | 30 |

EXAMPLE 83

A 10 liter autoclave was charged with 250 g. of vinyl acetate, 2400 g. of water, 24 g. of potassium persulfate (polymerization catalyst), 24 g. of sodium lauryl sulfate (emulsifying agent) and 20 g. of sodium hydrogen phosphate (pH regulating agent) and air in the autoclave was replaced with nitrogen and then with ethylene and thereafter the inner temperature of the autoclave was raised to 65° C. and ethylene was introduced into the autoclave at a pressure of 70 kg./cm.$^2$ to maintain the pressure at a constant value while vinyl acetate was continuously introduced into the autoclave through a compressor at a rate of 225 g./hr. and then polymerization was carried out for 12 hours.

As the result, 6140 g. of emulsion (resin content: 54%) of vinyl acetate-ethylene copolymer were thus obtained. The analysis of said copolymer showed that the weight ratio of vinyl acetate:ethylene was 56.3:43.7 and the intrinsic viscosity $[\eta]$ was 0.11.

To the emulsion, 1900 g. of polyvinyl chloride emulsion resin content: 35%; particle size: about $1\mu$; 20% based on copolymer, as polyvinyl chloride) were added and sufficiently mixed together and then the obtained mixture was added to methanol to precipitate the copolymer. The precipitate was washed with water several times and then dispersed into methanol while 100 g. of fine powdery barium stearate (3% based on copolymer) and the methanol slurry of the copolymer was thoroughly agitated and mixed together. On the removal of methanol and the drying, a white fine powdery copolymer composition was obtained. When the composition was stored or was packed into a bag and transported no agglomeration occurred.

As a control, when Example 83 was repeated except that the addition of barium stearate was omitted, the obtained composition was simply agglomerated.

EXAMPLES 84 TO 86

Example 83 was repeated except that 148 g. of zinc stearate (4.5% based on copolymer; Example 83), 132 g. of cadmium laurate (4% based on copolymer; Example 85) and 132 g. of oleinic amide (5.4% based on copolymer; Example 86) were respectively used in place of barium stearate to produce a copolymer composition.

In any case, the obtained product was a white fine powdery copolymer composition which did not block or agglomerate as in Example 83.

EXAMPLE 87

70 g. of a block of vinyl acetate-ethylene copolymer (weight ratio of vinyl acetate:ethylene was 50:50; intrinsic viscosity [η] was 0.15) were dissolved in benzene to obtain 170 g. of a benzene solution of copolymer. This solution was gradually poured into methanol with agitation to prescipitate said copolymer and then the precipitated copolymer was washed with methanol several times and was put in methanol with 3.5 g. of barium stearate (5% based on copolymer) and 14 g. of polyvinyl chloride powder having a particle size of about 15μ (20% based on copolymer) and then was thoroughly agitated and mixed together. And then methanol was removed from the mixture and the residue was dried to obtain a white powdery copolymer composition.

As a control, Example 87 was repeated except that the additions of barium stearate and polyvinyl chloride powder were omitted. The obtained composition was not sticky.

EXAMPLES 88 AND 89

Example 87 was repeated except that copolymer having a composition as descrbed in Table 4 was used in place of vinyl acetate-ethylene. In any case, a powdery copolymer composition was obtained as in Example 87.

(A) an inorganic lead salt selected from the group consisting of tribasic lead sulfate, dibasic lead phosphite, basic lead silicate, lead silicate modified with silica gel and basic lead carbonate;

(B) a carboxylic acid salt selected from the group consisting of lead stearate, basic lead stearate, dibasic lead stearate, cadmium stearate, calcium ricinoleate, zinc stearate, tin stearate, lead ricinoleate, cadmium ricinoleate, barium ricinoleate, calcium recinoleate, zinc ricinoleate, tin ricinoleate, cadmium laurate, barium, laurate, calcium laurate, zinc laurate, barium oleate, cadmium oleate, calcium oleate, tin oleate, dibasic lead phthalate, lead salicylate and lead naphthenate;

(C) a dialkyl tin carboxylic acid salt selected from the group consisting of dibutyl tin dilaurate, dioctyl tin dilaurate, dibutyl tin distearate, dioctyl tin distearate, dibutyl tin maleate, dioctyl tin maleate, dibutyl tin stearate-maleate, dioctyl tin stearate-maleate, dibutyl tin oleate-maleate and dioctyl tin oleate-maleate; and (D) a higher aliphatic acid amide selected from the group consisting of stearic acid amide, palmitic acid amide, oleic acid amide and methylene stearobisamide.

2. A process according to claim 1, wherein said copolymer further includes an amount up to 20% by weight of a copolymerizable monomer selected from the group consisting of vinyl chloride, acrylic acid, methacrylic acid, crotonic acid, maleic acid, and $C_1$ to $C_8$ alkyl esters and anhydrides thereof.

TABLE 4

| | Vinyl carboxylate-ethylene copolymer | | | | Antisticking agent | | | |
|---|---|---|---|---|---|---|---|---|
| | Composition of copolymer (Percent) | | | Amount of copolymer employed(g.) | Intrinsic viscosity [η] | Kind | Added amount (percent) | Nature of formed powdery copolymer |
| Example Nos. | Vinyl propionate | Ethylene | Vinyl chloride | | | | | |
| 88 | 57.7 | 29.7 | 12.0 | 70 | 0.06 | Cadmium stearate. | 4 | White nonblocking powder. |
| 89 | 68.4 | 31.6 | | 70 | 0.07 | do | 6 | Do. |

What we claim is:

1. A process for producing a dry, not sticky and finely divided compolymer of ethylene and a vinyl ester of an aliphatic carboxylic acid having 1 to 4 carbon atoms in the ratio of 20:80 to 70:30 by weight, which comprises treating the copolymer, which is in the form of a dispension, by adding (I) about 2 to 50 parts by weight of polyvinyl chloride powder having an average particle size less than 40 microns per 100 parts by net weight of said copolymer, and (II) about 2 to 30 parts by weight of at least one antisticking agent selected from the following, and then drying the mixture thus formed:

References Cited

UNITED STATES PATENTS 2,449,489  9/1948  Larson _____ 260—27
2,983,696  5/1961  Tocker _____ 260—23
3,125,545  5/1964  Van Cleve et al. ____ 260—897

DONALD E. CZAJA, Primary Examiner

D. J. BARRICK, Assistant Examiner

U.S. Cl. X.R.

260—31.2, 31.8, 32.6, 45.7, 45.75, 80.6, 80.81, 897